United States Patent [19]

Smith et al.

[11] 4,374,689
[45] Feb. 22, 1983

[54] METHOD AND APPARATUS FOR FILAMENT WINDING

[75] Inventors: Dale E. Smith, Windsor; Warren H. Pinter, East Hartland, both of Conn.

[73] Assignee: United Technologies Corporation, Hartford, Conn.

[21] Appl. No.: 286,129

[22] Filed: Jul. 23, 1981

[51] Int. Cl.³ .............................................. B65H 81/00
[52] U.S. Cl. .................................... 156/169; 156/425; 242/157.1
[58] Field of Search ............... 156/425, 172, 169, 175, 156/173, 428, 429, 430, 431, 432; 242/7.02, 7.21, 7.22, 157 R, 157 C, 157.1

[56] References Cited

U.S. PATENT DOCUMENTS

| 140,934 | 7/1873 | Mayall | 156/425 |
| 3,363,849 | 1/1968 | McCarty | 156/425 |
| 3,708,132 | 1/1973 | Lang | 156/180 |
| 4,267,007 | 5/1981 | Kellogg | 156/425 |

Primary Examiner—Michael W. Ball
Attorney, Agent, or Firm—John Swiatocha

[57] ABSTRACT

Filament band width uniformity is maintained in a filament winding process and apparatus therefor by a guide disposed between a winding eye and the mandrel about which the filaments are wound. The guide maintains a constant band payout angle with respect to the eye thereby maintaining uniform transverse reaction forces applied to the band by the eye.

4 Claims, 3 Drawing Figures ant winding apparatus generally does not have a capability for sufficient winding eye position adjustment to compensate for the extreme payout angle variations encountered in winding large articles of extreme asymmetry, such as the large wind turbine airfoil blades noted hereinabove.

METHOD AND APPARATUS FOR FILAMENT WINDING

DESCRIPTION

1. Technical Field

This invention relates to a method and apparatus for manufacturing articles by filament winding techniques, and more specifically, to such a method and apparatus characterized by enhanced ability to maintain a uniform filament band width for optimal strength and dimensional accuracy of the finished article.

2. Background Art

The popularity of filament winding techniques for the production of manufactured articles of enhanced strength is continually increasing. Such filament winding techniques generally involve the winding of high strength filaments disposed in a matrix of binder material about a form or mandrel corresponding in shape to the required shape of the finished article and then curing the matrix material.

Such filament winding techniques are generally performed on associated machinery which in general comprises means for supporting and rotating the mandrel or form, means for continually impregnating a continuous band of filamentary material with a resin system and a winding head which reciprocates along the length of the mandrel while moving both laterally and pivotally with respect to the mandrel for maintenance of proper filament orientation as the impregnated filament is wound around the mandrel.

It is generally accepted that to prevent unwanted voids in the finished article and to enhance the dimensional accuracy thereof, maintenance of accurate band width during the winding process is imperative. In prior art filament winding practices and apparatus, a winding eye is employed to guide the impregnated filament band to the mandrel. Where high filament densities (filament-to-filament contact) are required, it is generally recognized that a winding eye of curvilinear shape is required. The winding eye establishes a "payout angle" defined by that portion of the filament band extended between the winding eye and the mandrel and the longitudinal axis of that portion of the band entering the eye. It will be appreciated that in the filament winding of symmetric shapes such as cylinders, the payout angle remains constant so long as the relative positions of the winding eye and the axis of rotation of the cylinder remain fixed. However, it will likewise be appreciated that the payout angle will vary for a fixed winding eye and mandrel axis if the cross-sectional shape of the mandrel is asymmetric, with respect to the winding axis as where the mandrel is of airfoil cross-sectional shape. It can be seen that the variation in payout angle of the rovings, relative to the winding eye, results in a significant change in the amount of line contact between the curved winding eye and the rovings. As the rovings are pulled higher in the eye and the amount of line contact with the eye increases, the normal force on the eye is increased which increases the component of eye reaction force acting toward the center of the band and the band width decreases. A lower roving payout angle results in less line contact with the eye, lower eye reaction forces toward the center of the band and the band width increases. In some modern filament winding machinery, the winding eye position may be continually adjusted during the winding process to compensate for modest variations in payout angle. However, such fila-

DISCLOSURE OF INVENTION

Accordingly, it is a principal object of the present invention to provide an improved method and apparatus for filament winding wherein filament band width uniformity is preserved.

It is another object of the present invention to provide such an apparatus and method wherein the filament band width is preserved despite extreme asymmetry in mandrel cross-section.

It is another object of the present invention to provide such a method and apparatus which are readily adaptable to state-of-the-art filament winding techniques and apparatus.

It is another object of the present invention to provide such a method and apparatus which add little to the expense of filament winding methods and equipment.

In accordance with the present invention, a filament winding method including the steps of providing a band of continuous elongate filaments, treating the band with adhesive and passing the band through a winding eye prior to winding about a mandrel, includes the step of drawing the band through a guide fixed with respect to the winding eye subsequent to the passage of the band through the winding eye and prior to winding about the mandrel. Any variation in payout angle occurs between the guide and the mandrel rather than between the mandrel and winding eye. Accordingly, the payout angle at the winding eye remains uniform throughout the entire filament winding process, thereby insuring uniform band width. In a preferred embodiment, the guide comprises a pair of generally straight spaced bars between which the filament band is drawn whereby variation in payout angle from the guide does not result in any corresponding variation in transverse reaction forces applied to the band by the guide, thereby preserving uniform band width.

The foregoing and other features and advantages of the present invention will become more apparent with the following description and accompanying drawing.

BEST MODE OF CARRYING OUT THE INVENTION

Figure 1:
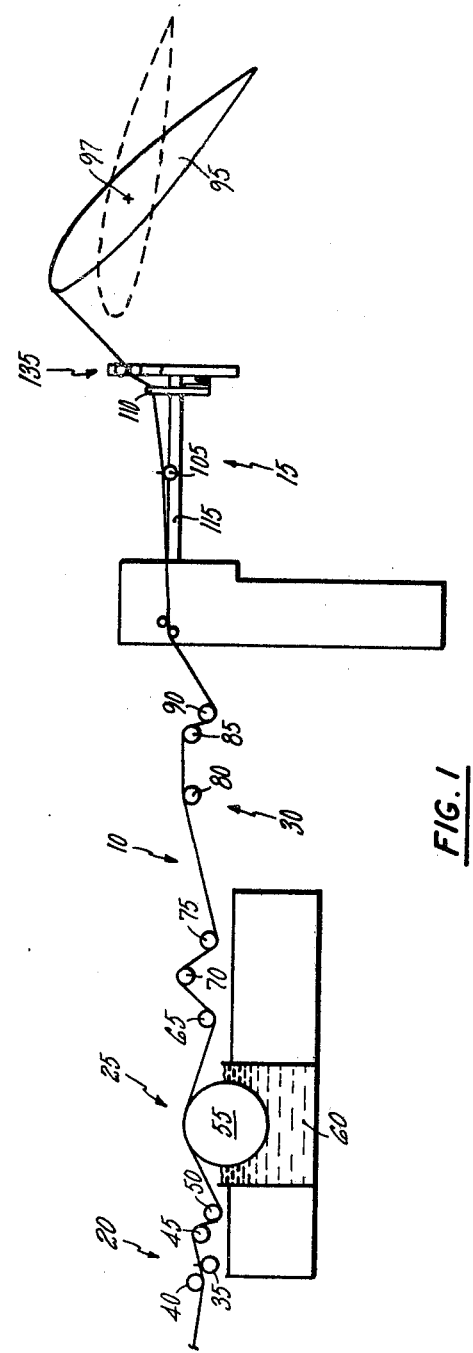
FIG. 1 is a schematic elevation of filament winding apparatus employing the present invention.

Referring to FIG. 1, a filament winding apparatus is shown generally at 10, comprising a winding head 15, means 20 for forming a plurality of filaments into a band thereof, means 25 for treating the filament band with an adhesive whereby the adhesive is applied by the roller or drum 55 and means 30 for guiding the band toward the winding head. Band forming means 20 adhesive treatment means 25 and guide means 30 are well known in the filament winding art and are commonplace in state-of-the-art filament winding apparatus and thus form no part of the present invention. Band forming means 20 comprises a comb 35 with outwardly extending teeth between which are drawn a plurality of elongate filaments supplied to the machine from a plurality of spools thereof (not shown) in a manner well known in the art. The filaments may be formed from such materials as S Glass, E Glass, Graphite, Kevlar, etc.

Bars 40, 45 and 50 are provided to maintain proper band tension in the vicinity of the comb. Adhesive treatment means 25 comprises a large adhesive supply roller 55 partially immersed in a bath 60 of suitable adhesive and rotated by friction from filaments in contact with surface, the rotation of the roller within bath 60 causing the upper roller surface to be continually supplied with adhesive which is transferred to the individual filaments as the filaments pass over the roller. After applying a suitable adhesive, the filamentary band is guided toward winding head 15 by first guide means 30, comprising tension bars 65, 70, 75, arranged in a suitable fashion. A form 95 is rotatably supported on the ends thereof in any suitable fashion and rotated by a suitable drive means (not shown) such as an electric motor. An end of the filamentary band is attached to the form, the rotation thereof drawing the band through winding head 15, as head 15 reciprocates along the length of the form, parallel to winding axis 97, (into and out of the plane of the drawing) thereby depositing a plurality of overlying wound layers of the adhesive-treated band on the form, each layer comprising a plurality of oblique turns. When the required amount of filamentary material is wound around the form, the resulting article is cured to set the adhesive and the form is removed in a manner well known in the art.

Figure 2:
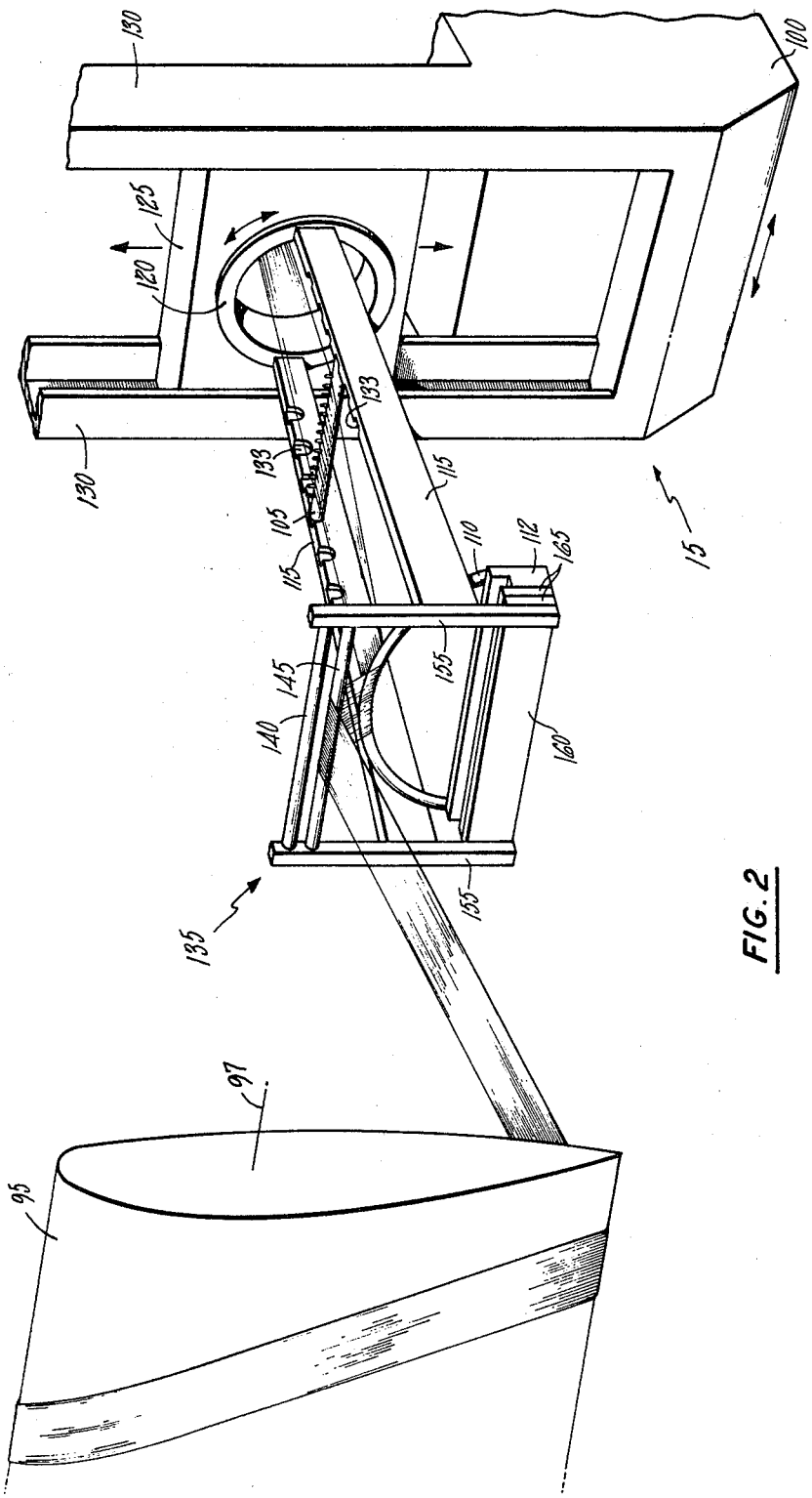
FIG. 2 is a perspective, fragmentary view of the filament winding apparatus of FIG. 1 as the apparatus is used in the manufacture of an article of airfoil cross-sectional shape.

Referring to FIG. 2, winding head 15 comprises a carriage 100 which, as set forth hereinabove, reciprocates parallel to the winding axis as form 95 rotates thereby drawing the filamentary material through the winding head and around the rotating form. Typically, carriage 100 includes a comb 105 including upstanding teeth between which the adhesively-treated fibers are drawn and a winding eye 110 through which the fibers are drawn, the eye laterally consolidating the fibers into a generally voidless band thereof for deposit onto form 95.

Figure 3:
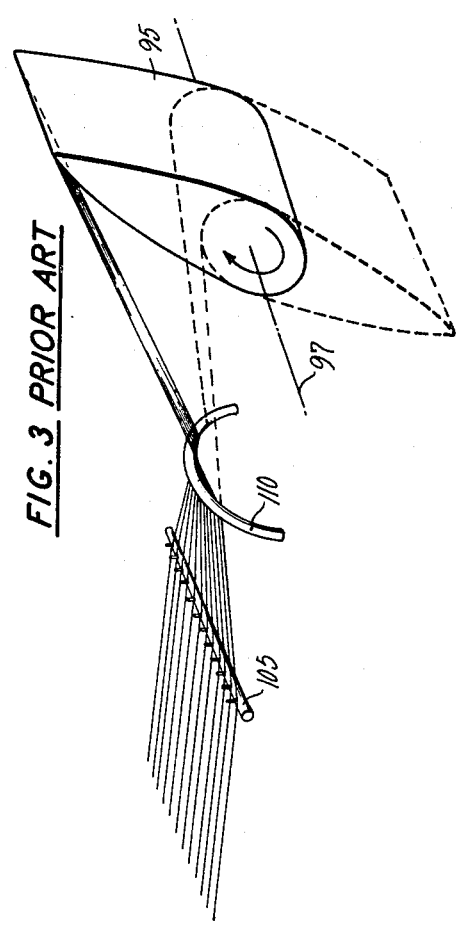
FIG. 3 is a schematic, perspective view of a curvilinear winding eye guiding filamentary material toward a mandrel of asymmetric cross section in a prior art filament winding process.

The winding eye is mounted on a bracket 112 therefor which, with comb 105, is mounted on rails 115 which reciprocate with carriage 100. The rails are mounted on rotatable ring 120 which is in turn mounted to carriage 125 which is vertically adjustable on upstanding tracks 130. The rails are provided with a plurality of spaced, opposing detents 135 which receive the ends of comb 105, the spacing of comb 105 from winding eye 110 being in part, determinative of the width of the band. As is known in the art, eye 110 consolidates the fibers by applying thereto a reaction force inwardly, toward the center of the band due to tension on the band and angular displacement of the band as it passes through the eye. It will be understood that due to a kind of camming relationship between the fibers of the band and eye 110, as the payout angle varies, the lateral reaction forces exerted on the band by the eye also vary. Referring to FIG. 3, as the fibrous band is continually wound around form 95, it is seen that in the position of form 95 illustrated by dotted lines, the form draws the filamentary band through the eye, the eye laterally compressing the filaments into a substantially continuous band thereof. However, when the form is rotated 180° to the position illustrated by solid lines, it is seen that the band is lifted upwardly. This substantially increases line contact between the band and the eye thus increasing the normal force on the eye, causing an increase in the lateral reactive forces applied to the band from the eye, thereby decreasing the band width. Assuming an optimal width corresponding to the dotted line position of form 95, that is, a width corresponding to side-to-side filament contact, it will be appreciated that narrowing the band in the manner described will necessarily result in bunching of the filaments as the band is wound around the form, thereby causing gaps between the narrower bands resulting in voids in the wound article and deviation from the desired article dimensions. While the ability of winding eye 110 to translate vertically with carriage 125 and pivot with ring 120 can, to a certain extent, compensate for the deviation in angular band disposition with respect to the winding eye, as set forth hereinabove, it has been determined that when winding articles of extreme asymmetry such as airfoils, existing equipment generally either does not have the capability of vertical eye motion or the amount of motion available is not adequate.

This problem associated with curvilinear winding eyes is overcome in the present invention wherein a second guide means 135 is disposed between the winding eye and form and fixed with respect to the winding eye, the second guide means guiding the filamentary band from the winding eye and angularly restraining the band with respect to the winding eye, thereby insuring a constant payout angle (the angle between that portion of the band drawn away from the winding eye and the longitudinal axis of that portion of the band being drawn into the winding eye). In the preferred embodiment, the second guide means comprises a pair of spaced bars, 140 and 145. The spacing is set to a minimum distance to provide free passage of the treated rovings between the bars. The bars are mounted on frame members 155 which are in turn mounted on a bracket 160 fixed to winding eye bracket 112. As shown in FIG. 2, spacers 165 may be provided to achieve an optimum spacing of the second guide means from the winding eye.

In the winding process, subsequent to the passing of the filamentary band through the winding eye, the band passes through second guide means. It will be appreciated that the second guide means maintains a constant payout angle with respect to the eye thereby maintaining uniform band width despite variations in angular orientation of that portion of the band extending between the form 95 and the winding bars 140 and 145. Since bars 140 and 145 are straight and exert no transverse reaction forces on the band, variations in payout angle from the bars do not result in any variation in band width.

Having thus described the invention, what is claimed is:

1. A method of filament winding an article comprising the steps of providing a plurality of continuous elongate filaments, forming a band of said filaments by the juxtaposition thereof in mutually spaced, parallel relationship, treating said filament band with an adhesive such that said adhesive is taken up by said filaments, passing said band through a winding eye and winding said filament around a mandrel to form said article, said method being characterized by the step of drawing said band through a guide fixed with respect to said winding eye subsequently to passing said band therethrough, said guide causing said winding eye to impart a uniform angular displacement to said band for maintenance of band width uniformity irrespective of asymmetrical mandrel shapes.

2. The method of claim 1 further characterized by said guide comprising a pair of bars including spaced portions between which said band is drawn.

3. An apparatus for forming an article by winding a plurality of fibers about a form, said apparatus comprising means for forming a plurality of filaments into a band thereof, a winding eye for maintaining proper band orientation with respect to said form, first means for guiding said filamentary band to said winding eye, said apparatus being characterized by second means disposed between said winding eye and said form and fixed with respect to said winding eye for guiding said band from said winding eye and angularly restraining said band with respect to said winding eye thereby maintaining a uniform payout angle of said band from said eye as said band is wound about said form.

4. The apparatus of claim 3 further characterized by said second guide means comprising a pair of bars having spaced portions between which said filamentary band is received.

* * * * *